(12) United States Patent
Higgins

(10) Patent No.: US 11,282,301 B2
(45) Date of Patent: Mar. 22, 2022

(54) METHOD AND SYSTEM FOR SYSTEMATIC MAINTENANCE OF MECHANICAL AND ELECTRICAL EQUIPMENT

(71) Applicant: Matthew Higgins, Bethpage, NY (US)

(72) Inventor: Matthew Higgins, Bethpage, NY (US)

( * ) Notice: Subject to any disclaimer, the term of this patent is extended or adjusted under 35 U.S.C. 154(b) by 391 days.

(21) Appl. No.: 16/236,266

(22) Filed: Dec. 28, 2018

(65) Prior Publication Data

US 2019/0206146 A1 Jul. 4, 2019

Related U.S. Application Data

(60) Provisional application No. 62/611,936, filed on Dec. 29, 2017.

(51) Int. Cl.
*G07C 3/08* (2006.01)
*G06K 19/06* (2006.01)
*G06Q 10/06* (2012.01)

(52) U.S. Cl.
CPC ......... *G07C 3/08* (2013.01); *G06K 19/06028* (2013.01); *G06Q 10/06* (2013.01)

(58) Field of Classification Search
CPC .... G07C 3/08; G06K 19/06028; H04L 29/08; H04L 67/02; H04L 29/06; G06Q 20/32;
(Continued)

(56) References Cited

U.S. PATENT DOCUMENTS 8,281,030 B2 * 10/2012 Wang ............... H04L 67/02
709/238
10,885,511 B2 * 1/2021 Chen ............... H04M 1/2755
(Continued)

FOREIGN PATENT DOCUMENTS

CN 105701660 * 6/2016 ............ G06Q 20/32
CN 107231389 * 10/2017 ............ H04L 29/08
(Continued)

OTHER PUBLICATIONS

1D Barcode Verification Process Implementation Guideline, Jul. 2015, 44 pages (Year: 2015).*
(Continued)

*Primary Examiner* — Tung S Lau
(74) *Attorney, Agent, or Firm* — Andrew Morabito

(57) ABSTRACT

A method for monitoring procedures performed on equipment, the method comprising; associating a plurality of barcodes, wherein each of the barcodes is associated with one of a plurality of components, wherein the plurality of components are associated with a piece of equipment, establishing at least one procedure associated with each of the plurality of barcodes relative to the associated component, identifying a first barcode scanned by an image capturing device, identifying at least one procedure associated with the first barcode, providing, at least one or more steps associated with the at least one procedure, receiving confirmation of the at least one procedure to be performed, determining the confirmation of the completion of at least one step of the at least one procedure, processing if the identified procedure has been completed, and generating a report based on the completed identified procedure.

20 Claims, 8 Drawing Sheets

(58) Field of Classification Search
CPC .... G06Q 40/00; G06Q 10/06; G06Q 30/0222; G06Q 20/202; G06Q 20/20
See application file for complete search history.

(56) References Cited

U.S. PATENT DOCUMENTS

| | | | |
|---|---|---|---|
| 2012/0185317 A1* | 7/2012 | Wong | G06Q 30/0222 705/14.23 |
| 2014/0100973 A1* | 4/2014 | Brown | G06Q 20/3274 705/17 |
| 2016/0005019 A1* | 1/2016 | Paulo Rodrigues | G06Q 20/202 705/21 |

FOREIGN PATENT DOCUMENTS

| | | | | |
|---|---|---|---|---|
| CN | 108366122 | * | 8/2018 | ............ H04L 29/08 |
| CN | 108805685 | * | 11/2018 | ............ G06Q 40/00 |
| CN | 11016642 | * | 8/2019 | ............ H04L 29/06 |
| WO | WO 2014/128624 | * | 8/2014 | ............ G06Q 20/20 |

OTHER PUBLICATIONS

R.W. Askeland, Improving transfusion safety: implementation of a comprehensive computerized bar code-based tracking system for detecting and preventing errors, 10 pages, Transfusion vol. 48, Jul. 2008 (Year: 2008).*

Esin Ergen, Tracking and locating components in a precast storage yard utilizing radio frequency identification technology and GPS, 14 pages, 2007 (Year: 2007).*

\* cited by examiner

METHOD AND SYSTEM FOR SYSTEMATIC MAINTENANCE OF MECHANICAL AND ELECTRICAL EQUIPMENT

CROSS-REFERENCE TO RELATED APPLICATIONS

This application claims the benefit of priority under 35 USC 120) of U.S. application No. 62/611,936 filed on Dec. 29, 2017. The disclosure of the prior applications is considered part of (and is incorporated by reference in) the disclosure of this application.

BACKGROUND

This disclosure relates generally to vertical transportation, and more specifically to a method, computer program and computer system for establishing maintenance and inspection protocols and verifying the completion of these protocols for various electrical, mechanical, or electro-mechanical equipment.

Barcodes have become representative of means for automatically reading in information. The information stored on a barcode can be regarded as a type of database.

Mechanical and Electrical pieces of equipment, for example, elevators, escalators, boilers, Heating, Ventilation, and Air Conditioning (HVAC) systems, have a complex mix of software-driven machinery and electronics. This complexity has resulted in these systems requiring constant maintenance to maintain the efficiency, comfort, and most importantly safety of these systems.

A primary cause of equipment failure leading to unscheduled downtime is the delay or omission of scheduled maintenance. Relevant and timely equipment maintenance helps prevent unscheduled downtime or injury. However, since many of these systems do not provide for an integrated system to alert of currently required scheduled maintenance requirements and related required resources. Many systems have predetermined and set maintenance schedules to provide constant maintenance to circumvent any failures from occurring based on known usage and part decay rates.

The maintenance of the system has set maintenance intervals, causing more or less extensive maintenance service to be performed than is required. This led to the situation where system components needing less maintenance are serviced too often, because the service intervals are oriented to meet the requirements of the maintenance-intensive components. Thereby, unnecessary maintenance was undertaken, which then increased the maintenance cost of the system.

In some situations, the maintenance is not performed or partially done and there is no method to confirm the completion of the maintenance or the quality of the maintenance other than through the maintenance service provider, or through hiring a third party.

Therefore, it is desired for a method, computer program, or computer system to be able to establish a maintenance schedule that is documented, systematic, and modifiable based on the needs and requirements of the system.

SUMMARY

The present invention embodies a method for monitoring procedures performed on equipment, the method comprising: associating, by one or more processors, a plurality of barcodes, wherein each of the barcodes is associated with one of a plurality of components, wherein the plurality of components are associated with a piece of equipment; establishing, by one or more processors, at least one procedure associated with each of the plurality of barcodes relative to the associated component; identifying, by one or more processors, a first barcode scanned by an image capturing device; identifying, by one or more processors, at least one procedure associated with the first barcode; providing, by one or more processors, at least one or more steps associated with the at least one procedure; receiving, by one or more processors, confirmation of the at least one procedure to be performed; determining, by one or more processors, the confirmation of the completion of at least one step of the at least one procedure, wherein if the confirmation of the completion of the at least one step is successful, a new procedure is identified and a request for the scanning of a second barcode is generated; wherein if the confirmation of the competition of the at least one step is non-successful, a new procedure is identified and a request for information is generated; processing, by one or more processors, if the identified procedure has been completed; and generating, by one or more processors, a report based on the completed identified procedure.

The present invention embodies, in a second embodiment, a computer program product for monitoring procedures performed on equipment, the computer program product comprising: one or more computer readable storage media and program instructions stored on the one or more computer readable storage media, the program instructions comprising: program instructions to associate a plurality of barcodes, wherein each of the barcodes is associated with one of a plurality of components, wherein the plurality of components are associated with a piece of equipment; program instructions to establish at least one procedure associated with each of the plurality of barcodes relative to the associated component; program instructions to identify a first barcode scanned by an image capturing device; program instructions to identify at least one procedure associated with the first barcode; program instructions to provide at least one or more steps associated with the at least one procedure; program instructions to receive confirmation of the at least one procedure to be performed; program instructions to determine the confirmation of the completion of at least one step of the at least one procedure, wherein if the confirmation of the completion of the at least one step is successful, a new procedure is identified and a request for the scanning of a second barcode is generated; wherein if the confirmation of the competition of the at least one step is non-successful, a new procedure is identified and a request for information is generated; program instructions to process if the identified procedure has been completed; and program instructions to generate a report based on the completed identified procedure.

A computer system for monitoring procedures performed on equipment, the computer program product comprising: one or more computer processors, one or more computer readable storage media, and program instructions stored on the one or more computer readable storage media for execution by, at least one of the one or more processors, the program instructions comprising: program instructions to associate a plurality of barcodes, wherein each of the barcodes is associated with one of a plurality of components, wherein the plurality of components are associated with a piece of equipment; program instructions to establish at least one procedure associated with each of the plurality of barcodes relative to the associated component; program instructions to identify a first barcode scanned by an image capturing device; program instructions to identify at least one procedure associated with the first barcode; program instructions to provide at least one or more steps associated with the at least one procedure; program instructions to receive confirmation of the at least one procedure to be performed; program instructions to determine the confirmation of the completion of at least one step of the at least one procedure, wherein if the confirmation of the completion of the at least one step is successful, a new procedure is identified and a request for the scanning of a second barcode is generated; wherein if the confirmation of the competition of the at least one step is non-successful, a new procedure is identified and a request for information is generated; program instructions to process if the identified procedure has been completed; and program instructions to generate a report based on the completed identified procedure.

Figure 1:
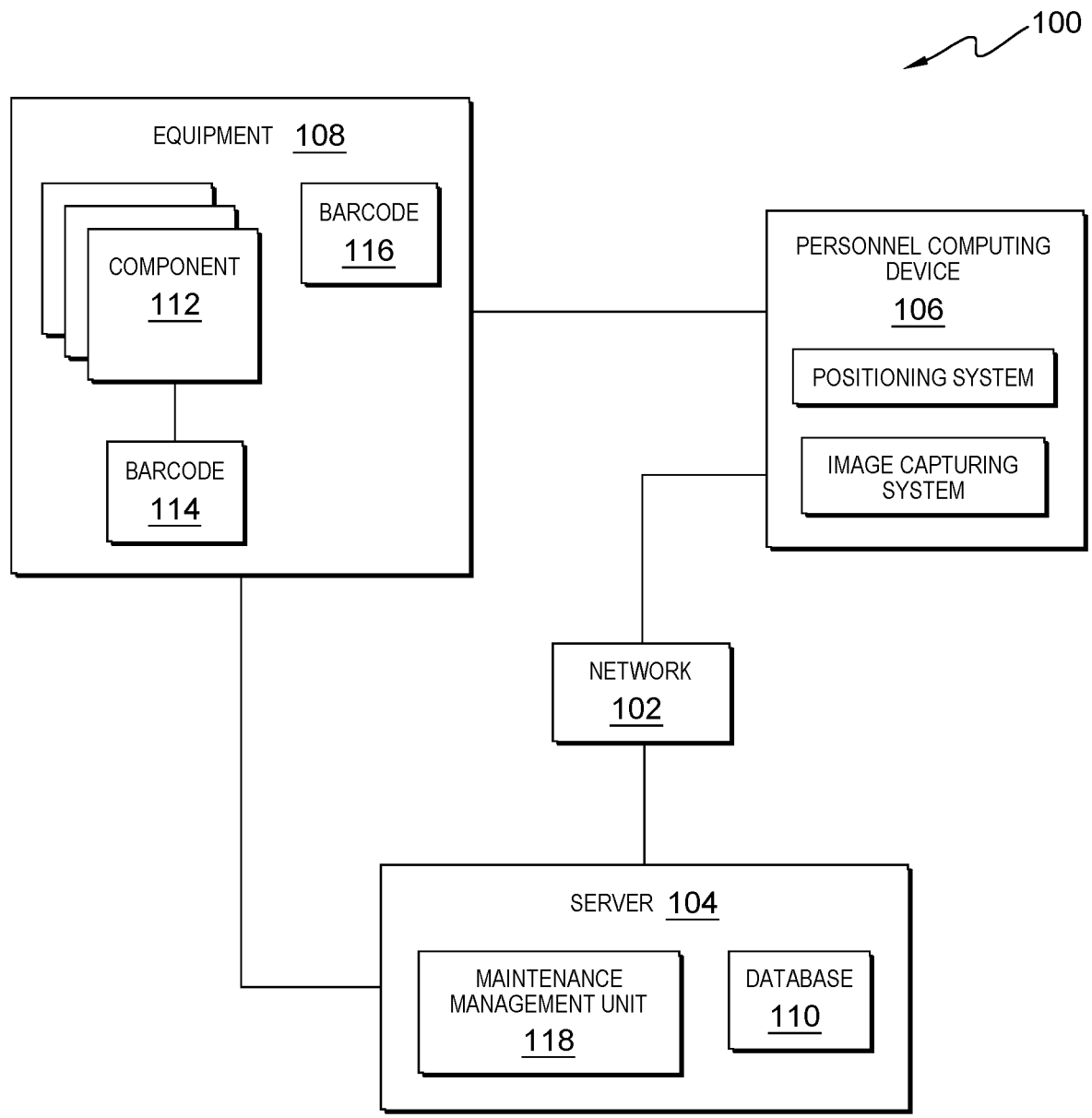
FIG. 01 depicts a block diagram depicting a computing environment, in accordance with one embodiment of the present invention.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

In accordance with one exemplary embodiment, the system provides for a structured and documented maintenance process, wherein based on the maintenance process settings, the personnel perform the maintenance steps in a regimented and documented process to assure each step is being performed and addressing any issues or repairs which are needed along the way.

The present invention will now be described in detail with reference to the Figures.

FIG. 1 depicts a block diagram of a computing environment 100 in accordance with one embodiment of the present invention. FIG. 1 provides an illustration of one embodiment and does not imply any limitations regarding the environment in which different embodiments maybe implemented. In the depicted embodiment, the computing environment 100 comprises, a network 102, a server 104, a personnel computing device 106, and equipment 108. The computing environment 100 may include additional servers, computers, or other devices not shown.

Network 102 may be a local area network (LAN), a wide area network (WAN) such as the Internet, any combination thereof, or any combination of connections and protocols that can support communications between the server 104, personnel computing device 106, and the equipment 108, in accordance with embodiments of the invention. Network 102 may include wired, wireless, or fiber optic connections. The network 102 can include links using technologies such as Ethernet, 802.11, worldwide interoperability for microwave access (WiMAX), 3G, 4G, 5G, CDMA, GSM, LTE, digital subscriber line (DSL), etc. Similarly, the networking protocols used on the network 102 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 102 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

Server 104 may be a management server, a web server, or any other electronic device or computing system capable of processing program instructions and receiving and sending data. In another embodiments server 104 may be a laptop computer, tablet computer, netbook computer, personal computer (PC), a desktop computer, or any programmable electronic device capable of communicating via network 102. In one embodiment, server 104 may be a server computing system utilizing multiple computers as a server system, such as in a cloud computing environment. In one embodiment, server 104 represents a computing system utilizing clustered computers and components to act as a single pool of seamless resources. In the depicted embodiment, the database 110 resides on server 104. Server 104 may include components, as depicted and described in further detail with respect to FIG. 3.

Database 110 may be a repository that may be written to and/or read by personnel computing device 106. The database 110 contains information related to the maintenance schedules for the equipment 108, the equipment components 112, the barcodes 114, the information generated by the personnel computing device 106, as well as other data associated with the maintenance processes or equipment 108 may be stored on database 110. In one embodiment, database 110 is a database management system (DBMS) used to allow the definition, creation, querying, update, and administration of a database(s). In the depicted embodiment, database 110 resides on server 104. In other embodiments, database 110 resides on another server, or another computing device, provided that database 110 is accessible by the personnel computing device 106.

Personnel computing device 106 comprise one or more computing devices which can receive input from a user and transmit and receive data via network 102. The personnel computing device 106 may be any other electronic device or computing system capable of processing program instructions and receiving and sending data. In one embodiment, the personnel computing device 106 a conventional computer system executing, for example, a Microsoft Windows compatible operating system (OS), Apple OS X, and/or a Linux distribution. In another embodiment, the personnel computing device 106 can be a device having computer functionality, such as a smart-phone, a mobile phone, a tablet, a personal digital assistant (PDA), a mobile telephone, etc. In some embodiments, personnel computing device 106 may be a laptop computer, tablet computer, netbook computer, personal computer (PC), a desktop computer, or any programmable electronic device capable of communicating with the barcodes 114 and server 104 via network 102. The personnel computing device 106 includes a positioning system, wherein the positioning system may be a global positioning system (GPS) or other system to identify the location of the personnel computing device 106. The personnel computing device 106 includes an image capturing system, where by the personnel computing device 106 is able to scan or "read" the barcodes 114.

In one embodiment, the personnel computing device 106 interact with the personnel through an application programming interface such as iOS and ANDROID. The personnel computing device 106 may display content through the processing of markup language and displaying this information through an application. The application displays the identified content using the format or presentation described by the markup language. Examples of the markup language are extensible markup language (XML) data, extensible hypertext markup language (XHTML) data, or other markup language data. The application may also include the ability to process JavaScript Object Notation (JSON) data, JSON with padding (JSONP), and JavaScript data to facilitate data-interchange between the personnel computing device 106 and the server 104. Personnel computing device 106 may include components, as depicted and described in further detail with respect to FIG. 3

The equipment 108 includes but is not limited to any pieces of equipment mechanical, electrical, or electro-mechanical that may need maintenance or repairs. For example, an elevator, an escalator, a HVAC system, a boiler, a moving walkway, a vehicle, a structure, or a device. The equipment 108 is either required by an individual, an entity, or government to provide maintenance of the equipment 108. The equipment 108 is comprised of a plurality of components 112. These components 112 may be systems, sub-systems, or individual components which are to be maintained by the personnel. The components 112 which are to be maintained each have a distinct and individualized barcode 114. The bar code 114 may be, but not limited to, interleaved 2 or 5, universal produce code, pdf417, Quick Response (QR) code, or the like known to those skilled in the art or industry specific standards. Each barcode 114 is associated with a specific component 112, or a piece of equipment 108 in barcode 116.

Maintenance management unit 118 provides the communication between the equipment 108, and the personnel computing device 106. The maintenance management unit 118 controls the communication between the personnel computing device 106 based on the received data and information. The maintenance management unit 118 provides the various procedures and steps (and additional information) to the personnel to complete the requests procedures, as well as assist the personnel in successfully completing the procedures and steps based on the received data from the personnel and the personnel computing device 106. The maintenance management unit 118 may be in constant communication with the various features and functions of the personnel computing device 106 to continuously gather data collected by the personnel computing device 106 to further assist the personnel and to collect additional information. In the depicted embodiment, maintenance management unit 118 is In the depicted embodiment, maintenance management unit 118 resides on server 104 and utilizes network 102 to the personnel computing device 106 and the barcodes 114 and 116. In one embodiment, maintenance management unit 118 resides on a separate server. In other embodiments, maintenance management unit 118 may be located on another server, computing device, or exist in a cloud computing system provided maintenance management unit 118 has access to the personnel computing device 106.

Figure 2:
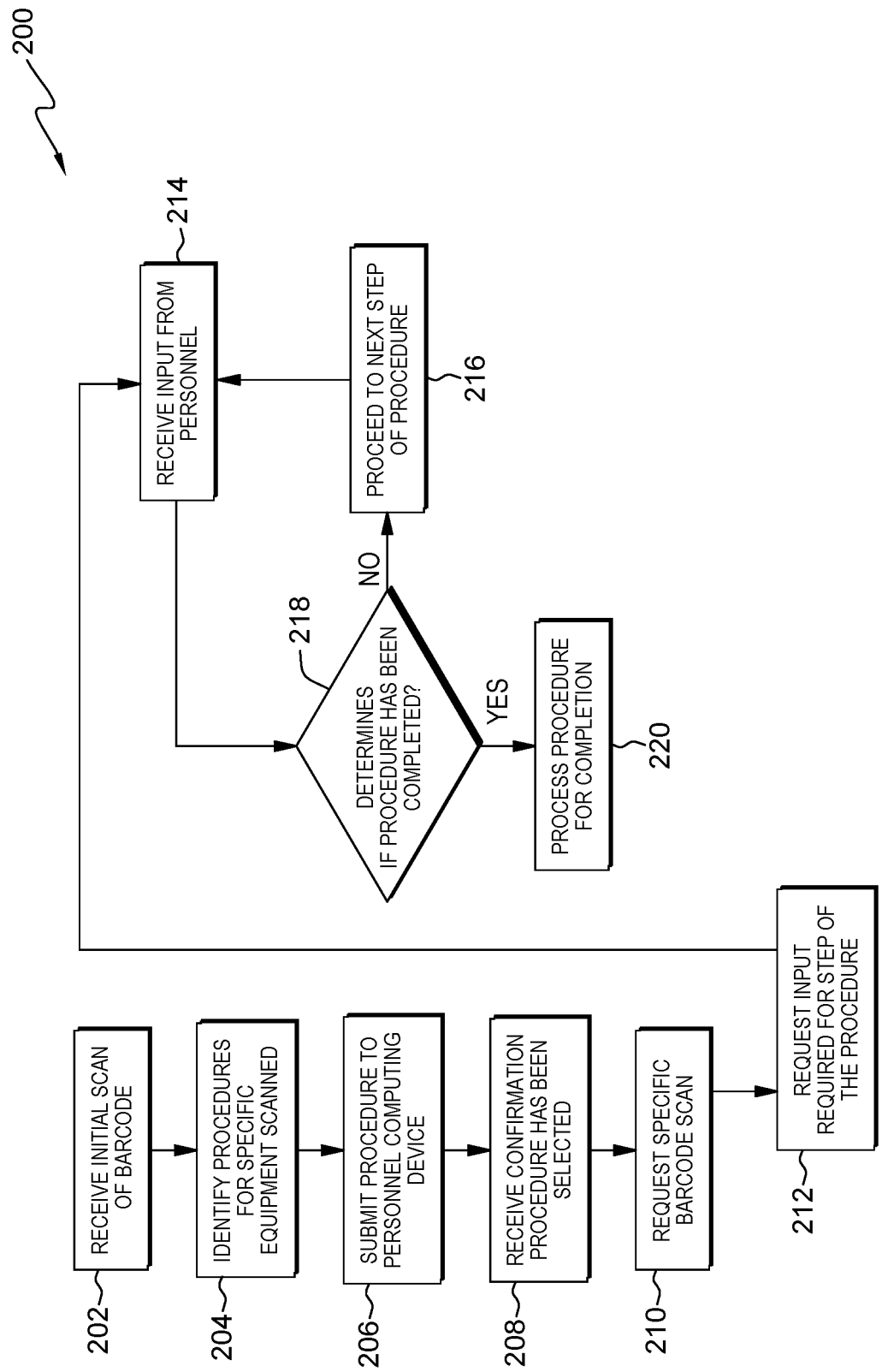
FIG. 02 depicts a flowchart of the operational steps taken by the management unit to initial, process, and submit a procedure for a piece of equipment using a computing device within the computing environment of FIG. 1, in accordance with an embodiment of the present invention.

FIG. 2 depicts flowchart 200 depicting a method for the transmitting of on-site maintenance actions through the use of barcodes 114 to identify the various steps and components of the procedure, in accordance with exemplary embodiments described here. It should be appreciated that there can be additional, fewer, or alternative steps performed in similar or alternative orders, or in parallel, in accordance with the various embodiments discussed herein unless otherwise stated. The method(s) and associated process(es) are now discussed, over the course of the following paragraphs, with extensive reference to FIG. 2, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

In step 202, the maintenance management unit 118, receives a scan of the barcode 116 from the personnel computing device 106. This initial scan of barcode 116 is to identify that the personnel is at the equipment 108 which is required to be inspected. This assists in confirming that the maintenance schedule for the equipment 108 is occurring at the proper date and time, that the personnel are at the proper location, and with the proper piece of equipment 108. The barcode 116 is used to identify the equipment 108. The maintenance management unit 118 accesses database 110 to identify the maintenance required for the equipment 108, and the components 112 at the time received. As various different maintenance schedules may be set for each piece of equipment 108, the maintenance management unit 118 is able to provide the personnel with the correct procedure to perform at that instance. The personnel used their personnel computing device 106 to scan the barcode 116.

In step 204, the maintenance management unit 118 identifies the procedure(s) to be performed on the equipment 108 and the components 112. Based the piece of equipment 108 which is associated with the barcode 116 scanned, a number of different procedures may be required to be performed by the personnel. In one embodiment, each equipment 108 may have a maintenance schedule where various components 112 are checked at predetermined intervals, and the personnel needs to perform multiple procedures on the equipment 108 in one instance.

In step 206, the maintenance management unit 118 submits the procedure instructions to the personnel. Based on the date, time, equipment 108, and other relevant information (e.g. required tools or equipment, warnings, or safety concerns), the maintenance management unit 118 provides the procedure(s) to the personnel which are scheduled to be completed at the time and with that piece of scanned equipment 108. The maintenance management unit 118 accesses the database 110 to locate and identify the various procedures to be performed based on barcode 116, date, and time, and maintenance management unit 118 provides the procedures to the personnel to identify the work required to be performed. Additionally, the maintenance management unit 118 identifies the specifics steps for each procedure. In some embodiments, the maintenance management unit 118 access videos of the procedures, steps, and components 112. In additional embodiments, the maintenance management unit 118 access other visual and audio data to assist the personnel in the procedures.

In step 208, the maintenance management unit 118, receives confirmation that a procedure has been selected. Through the confirmation by the personnel that the procedure is selected, the maintenance management unit 118 prompts the personnel with the initial step of the procedure. In some embodiments, the procedures (when more than one is required to be performed during the inspection) are provided to the personnel in a predetermined order based on the work performed. This may be selected to minimize repeat procedures and steps, or maybe organized to maximize time efficient. The maintenance management unit 118 determines the order of the procedures and if the personnel is able to arbitrary select which procedure to perform first. In some embodiments, the received confirmation is transmitted to a third party to identify the beginning of the procedure.

In step 210, the maintenance management unit 118, requests an image or scan of a barcode 114 based on the procedure requirements. The maintenance management unit 118 identifies to the personnel, which barcode 114 to scan at the start of the procedure to confirm the personnel's location and point of attention. The barcode 114 is associated with the first step of the procedure. In some embodiments, the maintenance management unit 118 identifies to the personnel how to locate or where to locate the specific barcode 114 either through video or images. In additional embodiments, a visual notification is presented to the personnel once the barcode 114 is captured.

The maintenance management unit 118, presents the step to be completed relative to the scheduled procedures and the barcode 114 scanned. In some embodiments, this step is not presented to the personnel until the barcode 114 is scanned or captured. In some embodiments, the presented material may be a description of the step, a video of how to perform the step, a series of images of how to perform the step, or the like. The personnel may have to submit specific images throughout the step or input various notes related to the step based on the step requirements. Each step has certain and specifics requirements. In additional embodiments, the maintenance management unit 118 may require an image captured or the scanning of a barcode 114 associated with each step to proceed to the next step.

In step 212, the maintenance management unit 118, receives the input from the personnel related to the step. This is either confirmation of the completion of the step, images which meet or exceed the program's requirements, or the scanning of the next barcode 114. Based on the step's requirements, the personnel submits this information to the maintenance management unit 118 to determine if the step has been successfully completed. In some embodiments, the personnel need to perform various actions based on the type of procedure being performed. For example, in maintenance tasking, there are numerous checks and barcode scans which much be completed. For emergency repairs, a report on the findings need to be input. For audits, various reports and information (as well as images) may be required. For repairs, the tasks each need to be completed and properly documented.

In decision 214, the maintenance management unit 118 determines if the procedure has been completed based on the requirements of the step and the received data from the personnel. This may include the submission of an image of a barcode 114, or the work performed, the completion of the presented materials, the selection of an option within the maintenance management unit 118, or the like. If the maintenance management unit 118, detects the input successfully completed the step, the maintenance management unit 118 determines if the all steps of the procedure has been completed (Yes branch, proceed to decision 220), wherein the program processes the procedure to completion. If the maintenance management unit 118 determines that the input was successful for completing the step, but there are additional steps (NO branch, proceed to step 216), the maintenance management unit 118 proceeds to the next step of the procedure. Step 216 is similar to step 210, in the personnel is requested to scan a barcode and is presented with a step and is required to perform certain actions to successfully complete the step of the procedure.

In step 220, the maintenance management unit 118 processes the completed procedure. This may include the submission of the procedure report to various parties. Based on the procedures to be performed by the personnel on the equipment 108, once a procedure is completed, the personnel may be prompted with a follow up procedure to be performed.

Figure 3:
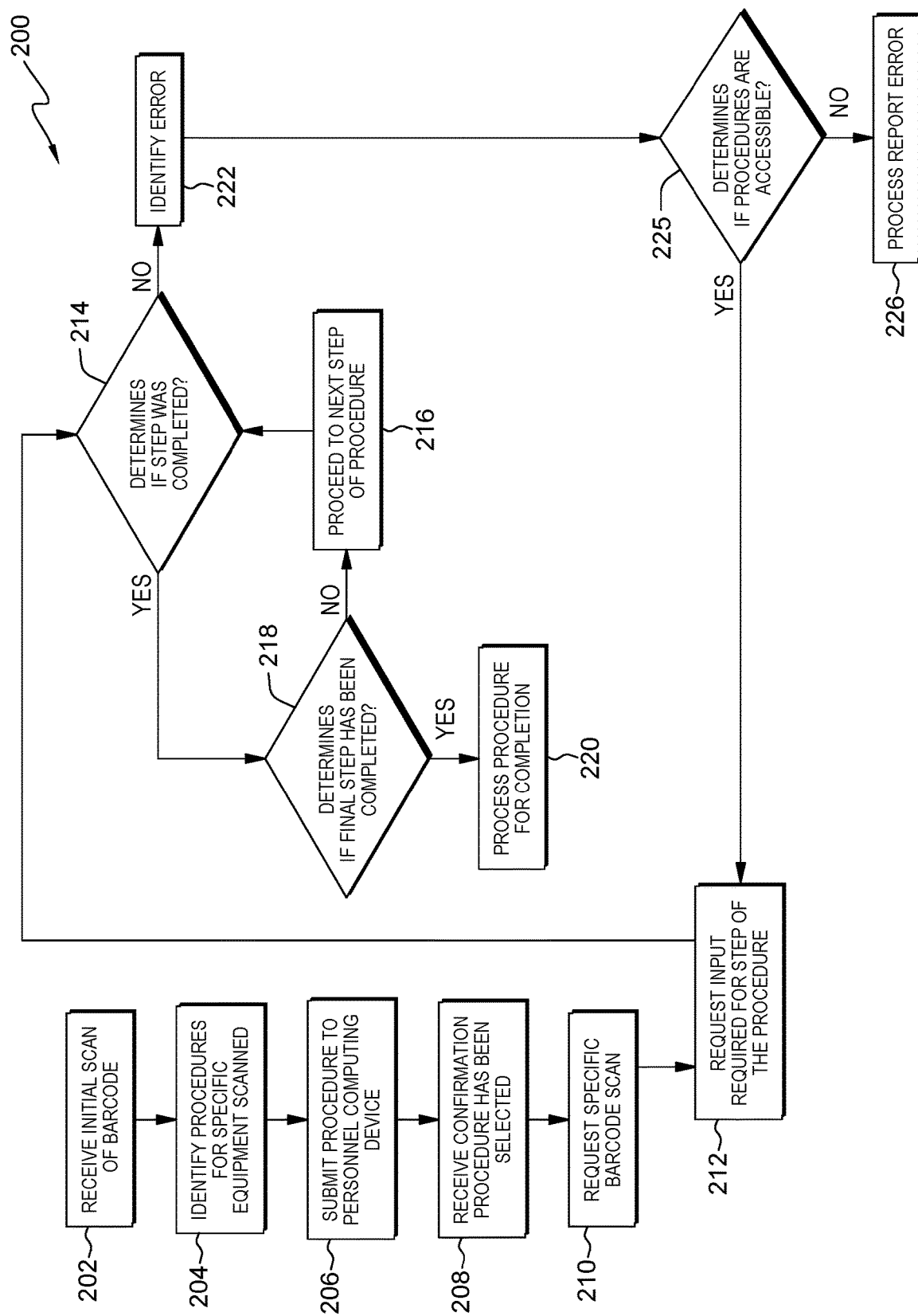
FIG. 03 depicts a flowchart of the operational steps taken by the management unit to initial, process, and submit a procedure for a piece of equipment using a computing device within the computing environment of FIG. 1, in accordance with an embodiment of the present invention.

In an additional embodiment, FIG. 3 depicts flowchart 300 depicting a method for the transmitting of on-site maintenance actions through the use of barcodes 114 to identify the various steps and components of the procedure, in accordance with exemplary embodiments described here. It should be appreciated that there can be additional, fewer, or alternative steps performed in similar or alternative orders, or in parallel, in accordance with the various embodiments discussed herein unless otherwise stated. The method(s) and associated process(es) are now discussed, over the course of the following paragraphs, with extensive reference to FIG. 3, in accordance with one embodiment of the present invention.

Similar to FIG. 2, the steps 202-212 in FIG. 3 are similar in nature. Decision 214, maintenance management unit 118 determines if the step was completed by the personnel. The basis for the completion of the step is based on the step requirements, a time frame expiring, or input from the personnel addressing additional issues or complications with the step. Wherein maintenance management unit 118 determines that the step was completed and proceeds to determine if the step completed was the final step of the procedure (YES branch, proceed to decision 220). Decision 218 is similar to decision 218 of FIG. 2, proceeding to completion in step 220 or providing the personnel with the next step in step 216. If the program 18 determines that the step was not completed (NO branch, proceed to step 222), the maintenance management unit 118 identifies the error.

In step 222, the maintenance management unit 118 identifies the error. The error may be detected through the expiration of a time frame which is set based on the specific step. In additional embodiments, the personnel may select a response or provide textual or pictorial information related to the step indicating the error or issue discovered or which occurred during the step. This may be based on an error of the personnel, another component 116 or the specific component 116 for the step breaking or malfunctioning, or the like.

In decision 225, the maintenance management unit 118 determines if procedures are accessible by the personnel that can be performed to correct the error. If the error is discoverable by the maintenance management unit 118, an analysis is performed to determine if another procedure or step is able to correct the discovered error. If the maintenance management unit 118 is able to determine if additional steps or procedures can correct the error (YES branch, proceed to step 212) the maintenance management unit 118 provides the personnel with the new step or procedure to be performed to correct the error. If the maintenance management unit 118 cannot determine a solution to the error (NO branch, proceed to step 226) the maintenance management unit 118 reports the error, and may require additional resources to correct the equipment.

In step 226, the maintenance management unit 118 processes the error report. This may include the submission of the procedure report to various parties. Based on the procedures to be performed by the personnel on the equipment 108, once a procedure is completed, the personnel may be prompted with a follow up procedure to be performed. In some embodiments, the processing of the error report, the maintenance management unit 118 submits the report to a plurality of predetermined parties.

Figure 4:
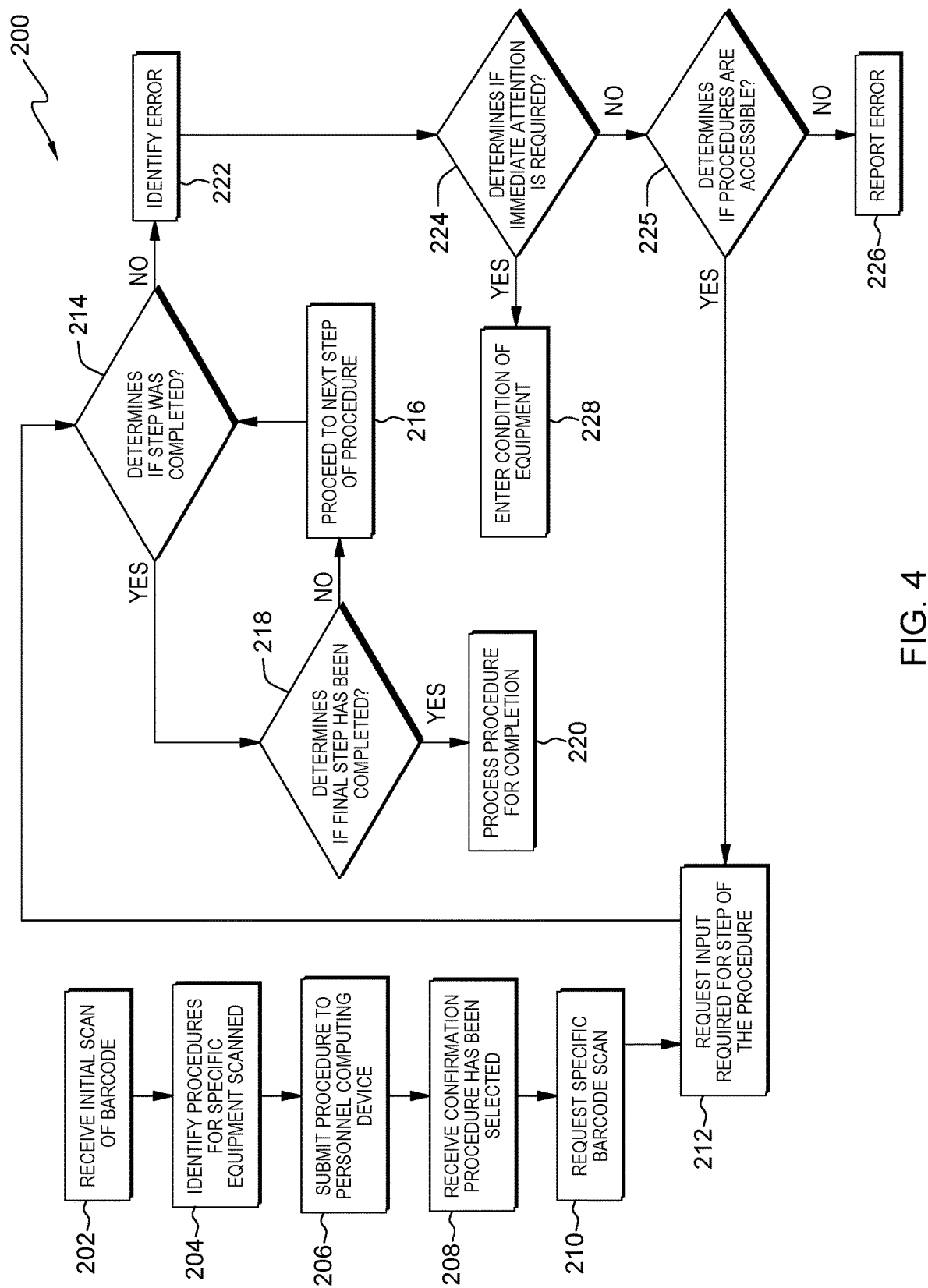
FIG. 04 depicts a flowchart of the operational steps taken by the management unit to initial, process, and submit a procedure for a piece of equipment using a computing device within the computing environment of FIG. 1, in accordance with an embodiment of the present invention.

In an additional embodiment, FIG. 4 depicts flowchart 400 depicting a method for the transmitting of on-site maintenance actions through the use of barcodes 114 to identify the various steps and components of the procedure, in accordance with exemplary embodiments described here. It should be appreciated that there can be additional, fewer, or alternative steps performed in similar or alternative orders, or in parallel, in accordance with the various embodiments discussed herein unless otherwise stated. The method(s) and associated process(es) are now discussed, over the course of the following paragraphs, with extensive reference to FIG. 4, in accordance with one embodiment of the present invention.

Similar to FIG. 3, steps 202-222 of FIG. 4 are similar in nature. In decision 224, the maintenance management unit 118 determines if immediate action is required based on the received information from the personnel and the identification of the maintenance management unit 118. If the program determines that immediate attention is required (YES branch, proceed to step 228, and maintenance management unit 118 enters the condition of the equipment 108 and/or component 112 to the database and the system to alert the desired personnel of the issue. The issue may create a serious safety risk which requires attention of various third parties and to protect persons from using the equipment in its current state. If the maintenance management unit 118 determines that immediate attention is not required (NO branch, proceed to decision 225), maintenance management unit 118 determines if procedures to correct the error are accessible by the personnel.

In decision 225, the maintenance management unit 118 determines if procedures are accessible by the personnel that can be performed to correct the error. If the error is discoverable by the maintenance management unit 118, an analysis is performed to determine if another procedure or step is able to correct the discovered error. If the maintenance management unit 118 is able to determine if additional steps or procedures can correct the error (YES branch, proceed to step 212) the maintenance management unit 118 provides the personnel with the new step or procedure to be performed to correct the error. If the maintenance management unit 118 cannot determine a solution to the error (NO branch, proceed to step 226) the maintenance management unit 118 reports the error, and may require additional resources to correct the equipment.

In step 226, the maintenance management unit 118 processes the error report. This may include the submission of the procedure report to various parties. Based on the procedures to be performed by the personnel on the equipment 108, once a procedure is completed, the personnel may be prompted with a follow up procedure to be performed. In some embodiments, the processing of the error report, the maintenance management unit 118 submits the report to a plurality of predetermined parties.

Figure 5:
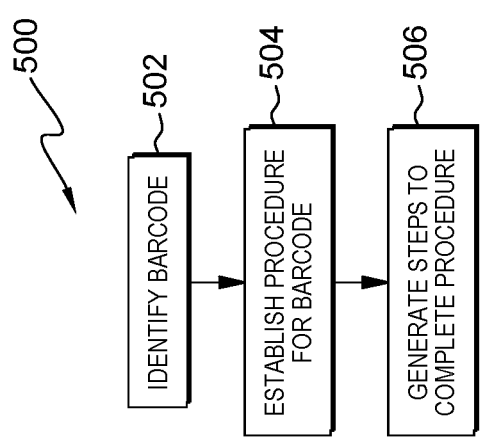
FIG. 05 depicts a flowchart of the operational steps taken by the management unit to establish the equipment's procedure using a computing device within the computing environment of FIG. 1, in accordance with an embodiment of the present invention.

FIG. 05 depicts a flowchart of the operational steps taken by the management unit to establish the equipment's procedure using a computing device within the computing environment of FIG. 1, in accordance with an embodiment of the present invention.

The maintenance management unit 118 establishes the association between the equipment 108, the components 112, and the steps which are associated with different maintenance schedules or tasks.

In step 502, maintenance management unit 118 identifies the barcode for the specific equipment 108 or component 112. The maintenance management unit 118 associates a barcode 114 with the component and or piece of equipment 108. This may be performed manually through the scanning of the barcode and associating it with the component 112 or the equipment 108. In some embodiments, each component 112 is assigned a barcode electronically.

In step 504, maintenance management unit 118 establishes the procedure for the barcode 114. Once each barcode 114 is associated with the component 112 or equipment 108, the maintenance management unit 118 associates each type of procedure that involves that barcoded component 112 or barcoded equipment 108. For example, multiple procedures may require the personnel to check the barcode component 112, and thus that specific piece of barcode component 112 is associated with the specific procedure.

In step 506, maintenance management unit 118 establishes the steps to complete the procedure. Each procedure has a requirement of certain steps which need to be performed to successfully check, repair, maintain, or adjust the component(s) 114. In some embodiments, maintenance management unit 118 is provided the procedure steps and associated images, video, or audio and associates the steps to the type of procedure with the barcoded components 114. In some embodiments, maintenance management unit 118 analyzes various training, maintenance, and repair manuals to determine the steps to successfully complete the procedure. In some embodiments, maintenance management unit 118 using a computer learning algorithm or artificial intelligence to determine the steps required to successfully complete the procedure for the barcoded components 114.

Figure 6:
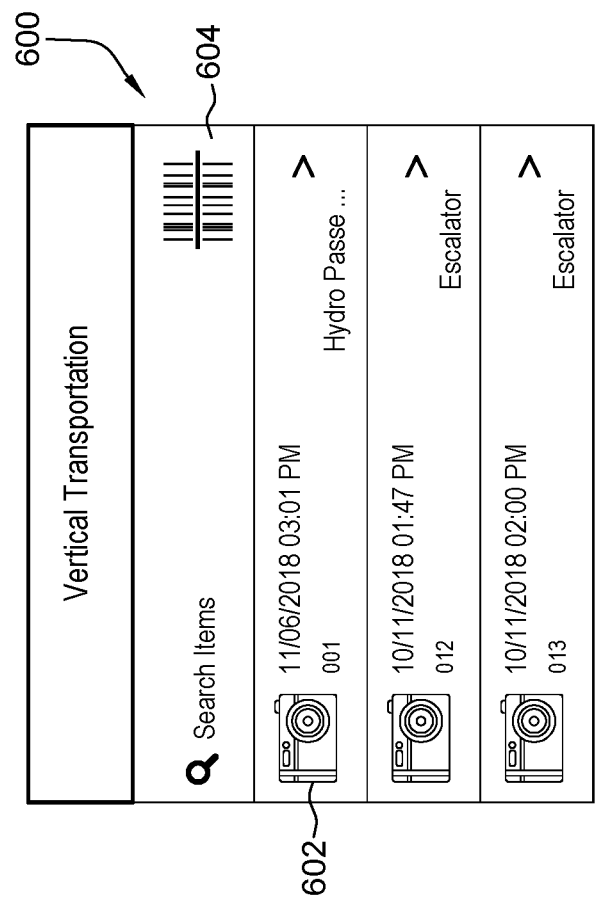
FIG. 06 depicts an image of a user interface, in accordance with one embodiment of the present invention.

FIG. 06 depicts an image of a user interface 600 depicting a screen of the selection process, in accordance with one embodiment of the present invention. In the depicted embodiment, the personnel computing device 106 user interface wherein the personnel is able to see a breakdown of the various pieces of equipment 108 which are to have procedures performed on them, and the day and approximate time which the work is to be performed. In some embodiments, an image 702 of the equipment 108 is shown to further assist the personnel locating the equipment 108. The personnel is able to initial the scan of the equipment by interacting with the barcode icon 704, wherein the image capturing system of the personnel computing device 106 is activated.

Figure 7:
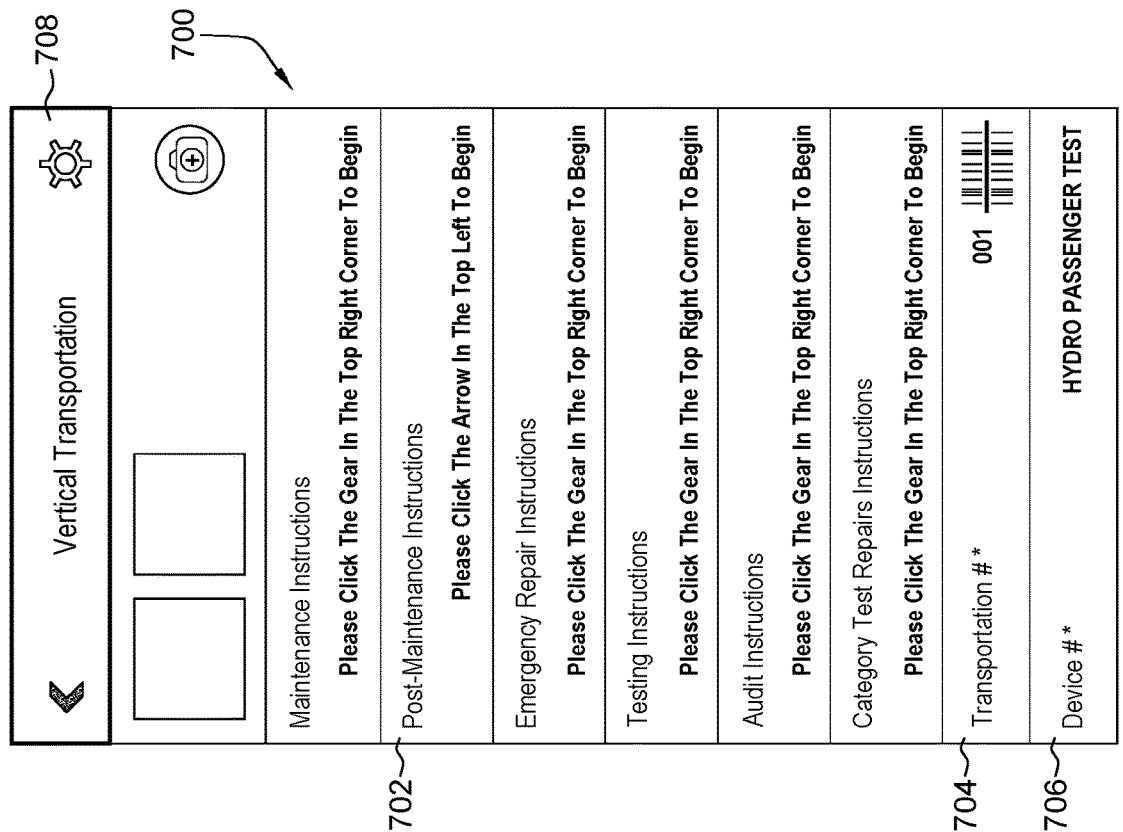
FIG. 07 depicts an image of a user interface, in accordance with one embodiment of the present invention.

FIG. 07 depicts an image of a user interface 700 depicting a screen of the selection process, in accordance with one embodiment of the present invention. Once the personnel has activated the image capturing system of the personnel computing device 106 and scans the barcoded equipment 108, a list of different procedure types 702 are presented to the personnel which are to be performed on the barcoded equipment 108. In the depicted embodiment, multiple different procedure types are presented to the personnel to select. In some embodiments, based on the equipment 106 and the date and time of the scanning, the procedure type 702 is limited. In some embodiments, these are ordered for the personnel to select the first procedures 702 and continue through the list. In the lower portion of the user interface, the equipment 704 is listed along with information 706 related to the equipment is shown to the personnel. In some embodiments, an icon 708 is presented to the personnel to begin the selection process for the specific procedures 702. In other embodiments, the user is able to directly select each procedure 702.

Figure 8:
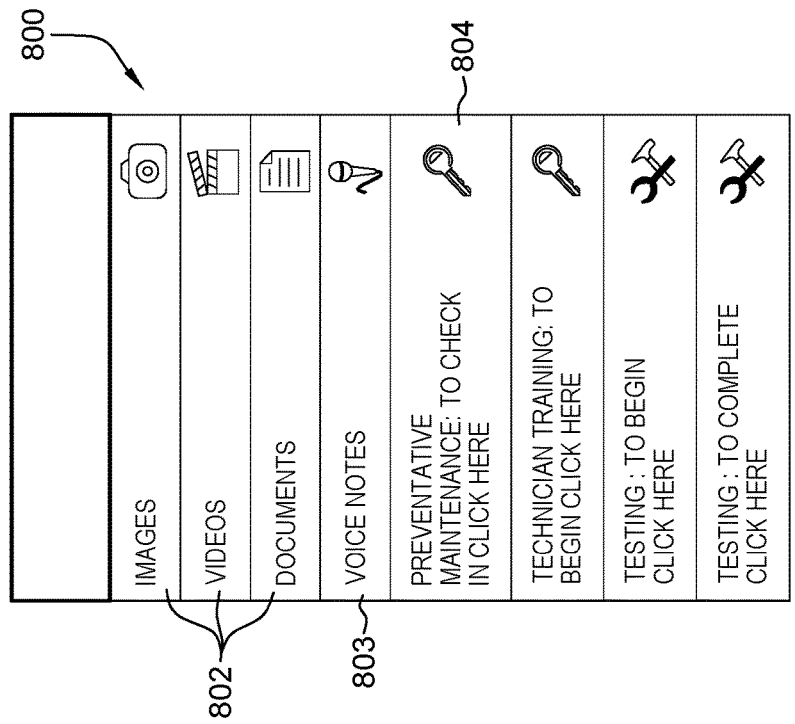
FIG. 08 depicts an image of a user interface, in accordance with one embodiment of the present invention.

FIG. 08 depicts an image of a user interface 800 depicting a screen of the selection process, in accordance with one embodiment of the present invention. In some embodiments, after the section of the icon 708, the personnel is presented with an additional menu, wherein the personnel is presented with a plurality of options and selections. The personnel is able to view various training aids 802 (e.g. images, videos, documents), input notes 803 (either written, verbal, or images), and a list of different types of procedures 804 which can be performed on the equipment 108. In the depicted embodiment, different types of procedures have different icons associated for the personnel. In some embodiments, this list presented only the options which are available to the personnel at the time.

Figures 9, 10:
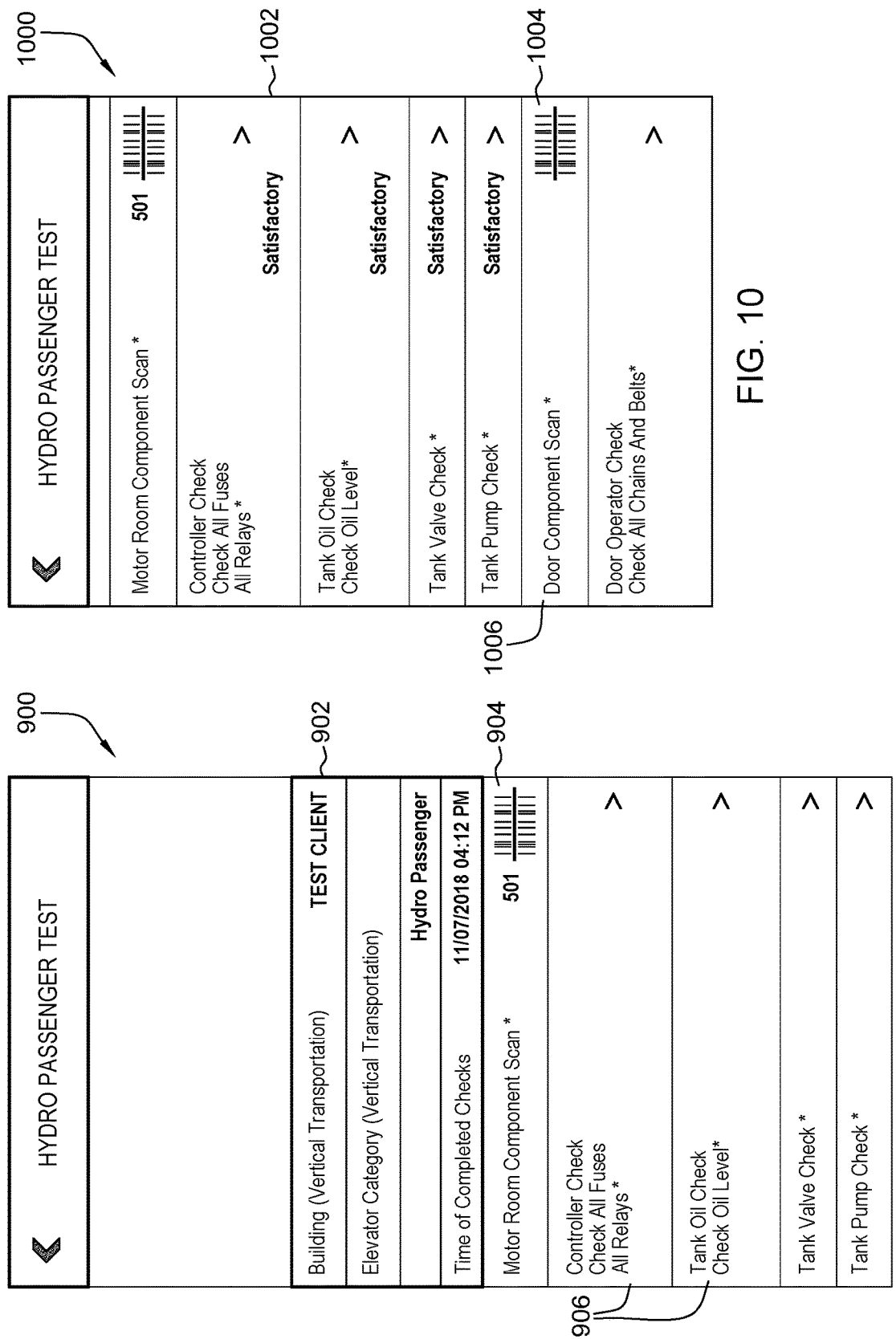
FIG. 09 depicts an image of a user interface, in accordance with one embodiment of the present invention.
FIG. 10 depicts an image of a user interface, in accordance with one embodiment of the present invention.

FIG. 09 depicts an image of a user interface 900 depicting a screen of the procedure list, in accordance with one embodiment of the present invention. Once the type of procedures is selected, the personnel is presented with the equipment information 902, the barcode 904 which needs to be scanned to initial the procedure, and the list of procedures 906. The initial barcode 904 is needed to be scanned before any procedure 906 can begin to confirm the location of the personnel. In some embodiments, the procedures 906 are presented in a predetermined order.

FIG. 10 depicts an image of a user interface 1000 depicting a screen of the procedure list, in accordance with one embodiment of the present invention. In the depicted embodiment, the personnel has completed a plurality of the procedures and the work has been completed and has been selected as "satisfactory" 1002. This is to identify that the procedure has been completed and there has been no issues. In additional embodiments, the personnel may include notes, images, or the like if additional information is needed or can provide further assistance. If the personnel selected the procedure is unsatisfactory, additional information may be required to be input and not option. Barcode 1004 is required to begin procedure 1006. For the plurality of completed procedures, to begin each procedure the personnel is required to scan a specific barcode associated with the procedure. Once the barcode 1004 is scanned, the personnel is able to access the specific steps, assistance (associated with the procedure) or the like to complete the procedure 1006.

Figure 11:
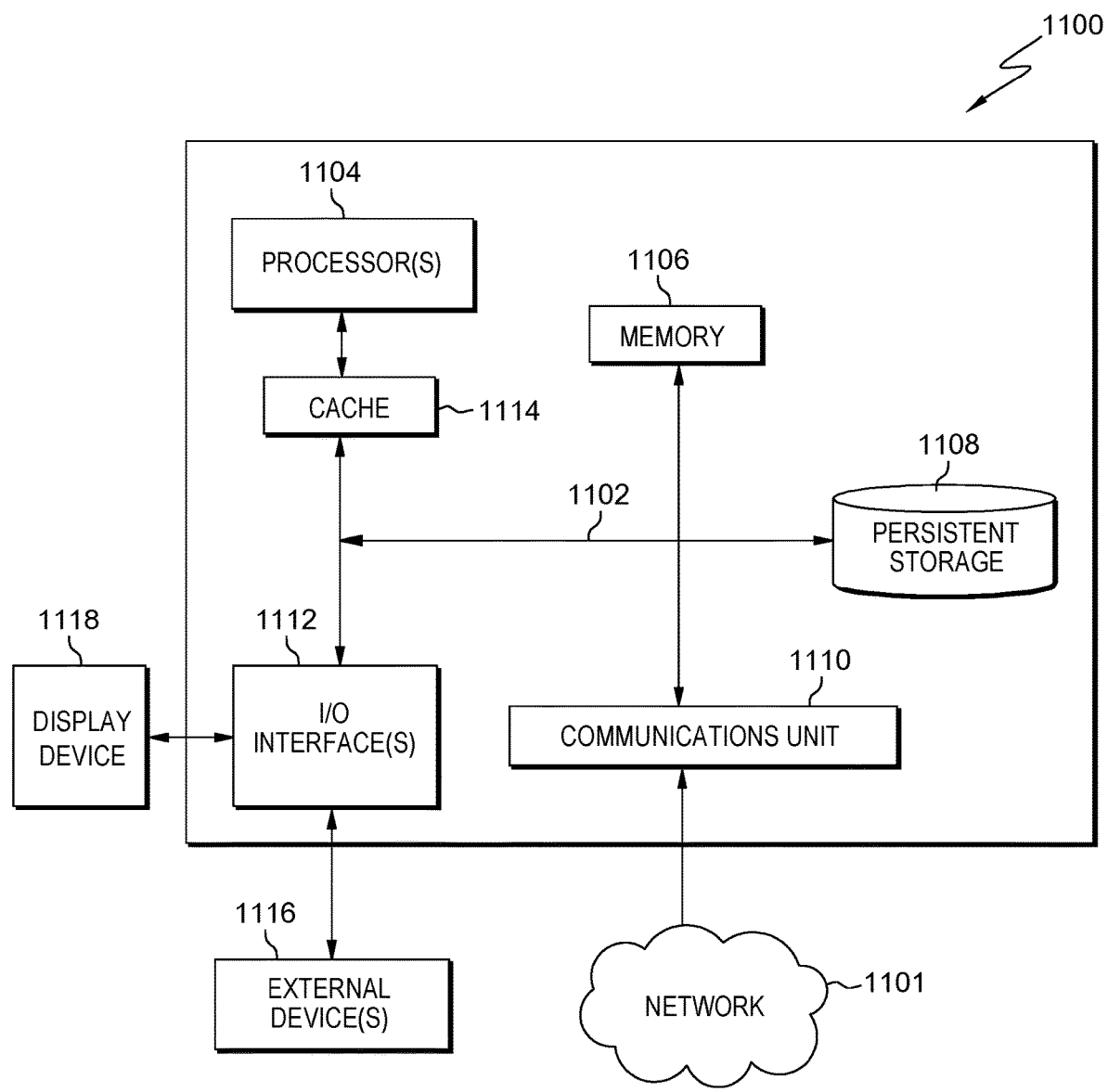
FIG. 11 depicts a block diagram depicting the internal and external components of the server of FIG. 1, in accordance with one embodiment of the present invention.

FIG. 11 depicts a block diagram depicting the internal and external components of the server and computing device of FIG. 1, in accordance with one embodiment of the present invention. Computing environment 1100 is, in many respects, representative of the various computer subsystem(s) in the present invention. Accordingly, several portions of computing environment 1100 will now be discussed in the following paragraphs.

Computing device 1100 includes communications fabric 1102, which provides communications between computer processor(s) 1104, memory 1106, persistent storage 1108, communications unit 1110, and input/output (I/O) interface(s) 1112. Communications fabric 1102 can be implemented with any architecture designed for passing data and/or control information between processors (such as microprocessors, communications and network processors, etc.), system memory, peripheral devices, and any additional hardware components within a system. For example, communications fabric 1102 can be implemented with one or more buses.

Computing device 1100 is capable of communicating with other computer subsystems via network 1101. Network 1101 can be, for example, a local area network (LAN), a wide area network (WAN) such as the Internet, or a combination of the two, and can include wired, wireless, or fiber optic connections. In general, network 1101 can be any combination of connections and protocols that will support communications between computing device 1100 and other computing devices.

Memory 1106 and persistent storage 1108 are computer-readable storage media. In one embodiment, memory 1106 includes random access memory (RAM) and cache memory 1114. In general, memory 1106 can include any suitable volatile or non-volatile computer-readable storage media.

Memory 1106 is stored for execution by one or more of the respective computer processors 1104 of computing device 1100 via one or more memories of memory 1106 of computing device 1100. In the depicted embodiment, persistent storage 1108 includes a magnetic hard disk drive. Alternatively, or in addition to a magnetic hard disk drive, persistent storage 1108 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 1108 may also be removable. For example, a removable hard drive may be used for persistent storage 1108. Other examples include optical and magnetic disks, thumb drives, and smart cards that are inserted into a drive for transfer onto another computer-readable storage medium that is also part of persistent storage 1108.

Communications unit 1110, in the examples, provides for communications with other data processing systems or devices, including computing device 1100. In the examples, communications unit 1110 includes one or more network interface cards. Communications unit 1110 may provide communications through the use of either or both physical and wireless communications links.

I/O interface(s) 1112 allows for input and output of data with other devices that may be connected to computing device 1100. For example, I/O interface 1112 may provide a connection to external devices 1116 such as a keyboard, keypad, camera, a touch screen, and/or some other suitable input device. External devices 1116 can also include portable computer-readable storage media such as, for example, thumb drives, portable optical or magnetic disks, and memory cards. Software and data used to practice embodiments of the present invention, can be stored on such portable computer-readable storage media and can be loaded onto persistent storage 1108 of computing device 1100 via I/O interface(s) 1112 of computing device 1100. Software and data used to practice embodiments of the present invention, can be stored on such portable computer-readable storage media and can be loaded onto persistent storage 1108 of computing device 1100 via I/O interface(s) 1112 of computing device 1100. I/O interface(s) 1112 also connect to a display 1118.

Display 1118 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

What is claimed is:

1. A method for monitoring procedures performed on equipment, the method comprising:
    associating, by one or more processors, a plurality of barcodes, wherein each of the barcodes is associated with one of a plurality of components, wherein the plurality of components are associated with a piece of equipment;
    establishing, by one or more processors, at least one procedure associated with each of the plurality of barcodes relative to the associated component;
    identifying, by one or more processors, a first barcode scanned by an image capturing device;
    identifying, by one or more processors, at least one procedure associated with the first barcode;
    providing, by one or more processors, at least one or more steps associated with the at least one procedure;
    receiving, by one or more processors, confirmation of the at least one procedure to be performed;
    determining, by one or more processors, the confirmation of the completion of at least one step of the at least one procedure,
        wherein if the confirmation of the completion of the at least one step is successful, a new procedure is identified and a request for the scanning of a second barcode is generated;
        wherein if the confirmation of the competition of the at least one step is non-successful, a new procedure is identified and a request for information is generated;
    processing, by one or more processors, if the identified procedure has been completed; and
    generating, by one or more processors, a report based on the completed identified procedure.

2. The method for monitoring procedures performed on equipment of claim 1, wherein once the at least one procedure is identified, further comprising, providing, by one or more processors, a tutorial of the at least one procedure.

3. The method for monitoring procedures performed on equipment of claim 1, further comprising, providing, by one or more processors, an indication of the successful or non-successful competition of the at least one step to a personnel.

4. The method for monitoring procedures performed on equipment of claim 1, further comprising, requiring, by one or more processors, the capturing of one of the at least one barcodes prior to providing the proceeding step of the at least one steps of the procedure.

5. The method for monitoring procedures performed on equipment of claim 1, further comprising, storing, by one or more processors the results of the at least one procedure at an external device.

6. The method for monitoring procedures performed on equipment of claim 1, further comprising, modifying, by one or more processors, the at least one steps of the procedure upon the determination that the step was non-successful.

7. The method for monitoring procedures performed on equipment of claim 1, further comprising, displaying, by one or more processors, the completion status of the at least one steps.

8. A computer program product for monitoring procedures performed on equipment, the computer program product comprising:
    one or more computer readable storage media and program instructions stored on the one or more computer readable storage media, the program instructions comprising:
    program instructions to associate a plurality of barcodes, wherein each of the barcodes is associated with one of a plurality of components, wherein the plurality of components are associated with a piece of equipment;
    program instructions to establish at least one procedure associated with each of the plurality of barcodes relative to the associated component;
    program instructions to identify a first barcode scanned by an image capturing device;
    program instructions to identify at least one procedure associated with the first barcode;
    program instructions to provide at least one or more steps associated with the at least one procedure;
    program instructions to receive confirmation of the at least one procedure to be performed;
    program instructions to determine the confirmation of the completion of at least one step of the at least one procedure,
        wherein if the confirmation of the completion of the at least one step is successful, a new procedure is identified and a request for the scanning of a second barcode is generated;
        wherein if the confirmation of the competition of the at least one step is non-successful, a new procedure is identified and a request for information is generated;
    program instructions to process if the identified procedure has been completed; and program instructions to generate a report based on the completed identified procedure.

9. The computer program product of claim 8, wherein once the at least one procedure is identified, further comprising, program instructions to provide a tutorial of the at least one procedure.

10. The computer program product of claim 8, further comprising, program instructions to provide an indication of the successful or non-successful competition of the at least one step to a personnel.

11. The computer program product of claim 8, further comprising, program instructions to require the capturing of one of the at least one barcodes prior to providing the proceeding step of the at least one steps of the procedure.

12. The computer program product of claim 8, further comprising, program instructions to store the results of the at least one procedure at an external device.

13. The computer program product of claim 8, further comprising, program instructions to modify the at least one steps of the procedure upon the determination that the step was non-successful.

14. The computer program product of claim 8, further comprising, program instructions to display the completion status of the at least one steps.

15. A computer system for monitoring procedures performed on equipment, the computer program product comprising:
   one or more computer processors, one or more computer readable storage media, and program instructions stored on the one or more computer readable storage media for execution by, at least one of the one or more processors, the program instructions comprising:
   program instructions to associate a plurality of barcodes, wherein each of the barcodes is associated with one of a plurality of components, wherein the plurality of components are associated with a piece of equipment;
   program instructions to establish at least one procedure associated with each of the plurality of barcodes relative to the associated component;
   program instructions to identify a first barcode scanned by an image capturing device;
   program instructions to identify at least one procedure associated with the first barcode;
   program instructions to provide at least one or more steps associated with the at least one procedure;
   program instructions to receive confirmation of the at least one procedure to be performed;
   program instructions to determine the confirmation of the completion of at least one step of the at least one procedure,
      wherein if the confirmation of the completion of the at least one step is successful, a new procedure is identified and a request for the scanning of a second barcode is generated;
      wherein if the confirmation of the competition of the at least one step is non-successful, a new procedure is identified and a request for information is generated;
   program instructions to process if the identified procedure has been completed; and
   program instructions to generate a report based on the completed identified procedure.

16. The computer system of claim 15, wherein once the at least one procedure is identified, further comprising, program instructions to provide a tutorial of the at least one procedure.

17. The computer system of claim 15, further comprising, program instructions to provide an indication of the successful or non-successful competition of the at least one step to a personnel.

18. The computer system of claim 15, further comprising, program instructions to require the capturing of one of the at least one barcodes prior to providing the proceeding step of the at least one steps of the procedure.

19. The computer system of claim 15, further comprising, program instructions to store the results of the at least one procedure at an external device.

20. The computer system of claim 15, further comprising, program instructions to modify the at least one steps of the procedure upon the determination that the step was non-successful.

* * * * *